United States Patent
Morton et al.

(10) Patent No.: US 12,144,705 B2
(45) Date of Patent: Nov. 19, 2024

(54) SYSTEMS AND METHODS FOR INDUCTION OF BIOLOGICAL RESPONSE IN SUPPORT STRUCTURES OF THE TEETH AND REPOSITIONING THEREOF

(71) Applicant: ALIGN TECHNOLOGY, INC., San Jose, CA (US)

(72) Inventors: John Morton, San Jose, CA (US); Angelo Maura, Amsterdam (NL); Mitra Derakhshan, Herndon, VA (US)

(73) Assignee: ALIGN TECHNOLOGY, INC., San Jose, CA (US)

( * ) Notice: Subject to any disclaimer, the term of this patent is extended or adjusted under 35 U.S.C. 154(b) by 311 days.

(21) Appl. No.: 17/586,663

(22) Filed: Jan. 27, 2022

(65) Prior Publication Data

US 2022/0151737 A1    May 19, 2022

Related U.S. Application Data

(63) Continuation of application No. 15/051,390, filed on Feb. 23, 2016, now Pat. No. 11,344,385.
(Continued)

(51) Int. Cl.
*A61C 7/08* (2006.01)
*A61C 7/00* (2006.01)

(52) U.S. Cl.
CPC .............. *A61C 7/08* (2013.01); *A61C 7/002* (2013.01)

(58) Field of Classification Search
CPC .. A61C 7/00; A61C 7/08; A61C 7/002; A61C 7/10
See application file for complete search history.

(56) References Cited

U.S. PATENT DOCUMENTS

| 5,820,368 A | 10/1998 | Wolk |
| 6,386,864 B1 | 5/2002 | Kuo |
| (Continued) | | |

FOREIGN PATENT DOCUMENTS

| JP | 2013502290 A | 1/2013 |
| JP | 2014155855 A | 8/2014 |
| KR | 101200014 B1 | 11/2012 |

OTHER PUBLICATIONS

Baumrind et al. "A Stereophotogrammetric System for the Detection of Prosthesis Loosening in Total Hip Arthroplasty NATO Symposium on Applications of Human Biostereometrics" Jul. 9-13, 1978 SPIE vol. 166 pp. 112-123.

*Primary Examiner* — Yogesh P Patel
(74) *Attorney, Agent, or Firm* — Wilson Sonsini Goodrich & Rosati

(57) ABSTRACT

A set of primer appliances and a set of treatment appliances to be worn by a subject are provided. The primer appliances are first worn to prepare the local environment of the teeth for further repositioning of the teeth by the treatment appliances. The primer appliances may apply compression or force to one or more support structures of the teeth, in a direction favorable for inducing a biological response of the one or more support structures that prepares the teeth for repositioning, for example by relaxing the tissue of the one or more support structures of the teeth. The primer appliances may cause minimal or no repositioning of the teeth. The treatment appliances are worn to reposition the teeth from an initial position to an end position of a treatment stage. The primer appliances can improve the efficiency and accuracy of tooth movement by the treatment appliances.

21 Claims, 4 Drawing Sheets

Related U.S. Application Data

(60) Provisional application No. 62/119,728, filed on Feb. 23, 2015.

(56) References Cited

U.S. PATENT DOCUMENTS

| | | |
|---|---|---|
| 6,607,382 B1 | 8/2003 | Kuo et al. |
| 6,783,604 B2 | 8/2004 | Tricca |
| 6,790,035 B2 | 9/2004 | Tricca et al. |
| 6,814,574 B2 | 11/2004 | Abolfathi et al. |
| 6,830,450 B2 | 12/2004 | Knopp et al. |
| 6,947,038 B1 | 9/2005 | Anh et al. |
| 7,074,039 B2 | 7/2006 | Kopelman et al. |
| 7,104,792 B2 | 9/2006 | Taub et al. |
| 7,121,825 B2 | 10/2006 | Chishti et al. |
| 7,160,107 B2 | 1/2007 | Kopelman et al. |
| 7,192,273 B2 | 3/2007 | McSurdy, Jr. |
| 7,347,688 B2 | 3/2008 | Kopelman et al. |
| 7,354,270 B2 | 4/2008 | Abolfathi et al. |
| 7,448,514 B2 | 11/2008 | Wen |
| 7,543,511 B2 | 6/2009 | Kimura et al. |
| 7,553,157 B2 | 6/2009 | Abolfathi et al. |
| 7,600,999 B2 | 10/2009 | Knopp |
| 7,658,610 B2 | 2/2010 | Knopp |
| 7,766,658 B2 | 8/2010 | Tricca et al. |
| 7,771,195 B2 | 8/2010 | Knopp et al. |
| 7,854,609 B2 | 12/2010 | Chen et al. |
| 7,871,269 B2 | 1/2011 | Wu et al. |
| 7,878,801 B2 | 2/2011 | Abolfathi et al. |
| 7,878,805 B2 | 2/2011 | Moss et al. |
| 7,914,283 B2 | 3/2011 | Kuo |
| 7,947,508 B2 | 5/2011 | Tricca et al. |
| 8,152,518 B2 | 4/2012 | Kuo |
| 8,172,569 B2 | 5/2012 | Matty et al. |
| 8,235,715 B2 | 8/2012 | Kuo |
| 8,292,617 B2 | 10/2012 | Brandt et al. |
| 8,337,199 B2 | 12/2012 | Wen |
| 8,401,686 B2 | 3/2013 | Moss et al. |
| 8,517,726 B2 | 8/2013 | Kakavand et al. |
| 8,562,337 B2 | 10/2013 | Kuo et al. |
| 8,641,414 B2 | 2/2014 | Borovinskih et al. |
| 8,684,729 B2 | 4/2014 | Wen |
| 8,708,697 B2 | 4/2014 | Li et al. |
| 8,758,009 B2 | 6/2014 | Chen et al. |
| 8,771,149 B2 | 7/2014 | Rahman et al. |
| 8,899,976 B2 | 12/2014 | Chen et al. |
| 8,936,463 B2 | 1/2015 | Mason et al. |
| 8,936,464 B2 | 1/2015 | Kopelman |
| 9,022,781 B2 | 5/2015 | Kuo et al. |
| 9,119,691 B2 | 9/2015 | Namiranian et al. |
| 9,241,774 B2 | 1/2016 | Li et al. |
| 9,326,831 B2 | 5/2016 | Cheang |
| 9,433,476 B2 | 9/2016 | Khardekar et al. |
| 9,610,141 B2 | 4/2017 | Kopelman et al. |
| 9,675,427 B2 | 6/2017 | Kopelman |
| 9,700,385 B2 | 7/2017 | Webber |
| 9,744,001 B2 | 8/2017 | Choi et al. |
| 9,844,424 B2 | 12/2017 | Wu et al. |
| 10,045,835 B2 | 8/2018 | Boronkay et al. |
| 10,111,730 B2 | 10/2018 | Webber et al. |
| 10,150,244 B2 | 12/2018 | Sato et al. |
| 10,201,409 B2 | 2/2019 | Mason et al. |
| 10,213,277 B2 | 2/2019 | Webber et al. |
| 10,299,894 B2 | 5/2019 | Tanugula et al. |
| 10,363,116 B2 | 7/2019 | Boronkay |
| 10,383,705 B2 | 8/2019 | Shanjani et al. |
| D865,180 S | 10/2019 | Bauer et al. |
| 10,449,016 B2 | 10/2019 | Kimura et al. |
| 10,463,452 B2 | 11/2019 | Matov et al. |
| 10,470,847 B2 | 11/2019 | Shanjani et al. |
| 10,492,888 B2 | 12/2019 | Chen et al. |
| 10,517,701 B2 | 12/2019 | Boronkay |
| 10,537,406 B2 | 1/2020 | Wu et al. |
| 10,537,463 B2 | 1/2020 | Kopelman |
| 10,548,700 B2 | 2/2020 | Fernie |
| 10,555,792 B2 | 2/2020 | Kopelman et al. |
| 10,588,776 B2 | 3/2020 | Cam et al. |
| 10,613,515 B2 | 4/2020 | Cramer et al. |
| 10,639,134 B2 | 5/2020 | Shanjani et al. |
| 10,743,964 B2 | 8/2020 | Wu et al. |
| 10,758,323 B2 | 9/2020 | Kopelman |
| 10,781,274 B2 | 9/2020 | Liska et al. |
| 10,813,720 B2 | 10/2020 | Grove et al. |
| 10,874,483 B2 | 12/2020 | Boronkay |
| 10,881,487 B2 | 1/2021 | Cam et al. |
| 10,912,629 B2 | 2/2021 | Tanugula et al. |
| 10,959,810 B2 | 3/2021 | Li et al. |
| 10,993,783 B2 | 5/2021 | Wu et al. |
| 11,026,768 B2 | 6/2021 | Moss et al. |
| 11,026,831 B2 | 6/2021 | Kuo |
| 11,045,282 B2 | 6/2021 | Kopelman et al. |
| 11,045,283 B2 | 6/2021 | Riley et al. |
| 11,103,330 B2 | 8/2021 | Webber et al. |
| 11,123,156 B2 | 9/2021 | Cam et al. |
| 11,154,382 B2 | 10/2021 | Kopelman et al. |
| 11,166,788 B2 | 11/2021 | Webber |
| 11,174,338 B2 | 11/2021 | Liska et al. |
| 11,219,506 B2 | 1/2022 | Shanjani et al. |
| 11,259,896 B2 | 3/2022 | Matov et al. |
| 11,273,011 B2 | 3/2022 | Shanjani et al. |
| 11,278,375 B2 | 3/2022 | Wang et al. |
| 2001/0041320 A1* | 11/2001 | Phan ............... A61C 19/00 433/24 |
| 2002/0064746 A1* | 5/2002 | Muhammad ....... A61C 7/00 433/24 |
| 2002/0192617 A1 | 12/2002 | Phan et al. |
| 2004/0166462 A1 | 8/2004 | Phan et al. |
| 2004/0166463 A1 | 8/2004 | Wen et al. |
| 2005/0014105 A1 | 1/2005 | Abolfathi et al. |
| 2005/0186524 A1 | 8/2005 | Abolfathi et al. |
| 2005/0244768 A1 | 11/2005 | Taub et al. |
| 2006/0019218 A1 | 1/2006 | Kuo |
| 2006/0078841 A1 | 4/2006 | Desimone et al. |
| 2006/0115782 A1 | 6/2006 | Li et al. |
| 2006/0115785 A1 | 6/2006 | Li et al. |
| 2006/0199142 A1 | 9/2006 | Liu et al. |
| 2006/0234179 A1 | 10/2006 | Wen et al. |
| 2008/0118882 A1 | 5/2008 | Su |
| 2008/0160473 A1 | 7/2008 | Li et al. |
| 2008/0286716 A1 | 11/2008 | Sherwood |
| 2008/0286717 A1 | 11/2008 | Sherwood |
| 2009/0280450 A1 | 11/2009 | Kuo |
| 2010/0055635 A1 | 3/2010 | Kakavand |
| 2010/0129763 A1 | 5/2010 | Kuo |
| 2010/0167225 A1* | 7/2010 | Kuo ................. A61C 7/002 702/137 |
| 2011/0020761 A1* | 1/2011 | Kalili ............... A61C 7/08 433/214 |
| 2011/0269092 A1 | 11/2011 | Kuo et al. |
| 2014/0067334 A1 | 3/2014 | Kuo |
| 2015/0265376 A1 | 9/2015 | Kopelman |
| 2015/0366638 A1 | 12/2015 | Kopelman et al. |
| 2016/0193014 A1 | 7/2016 | Morton et al. |
| 2016/0242871 A1 | 8/2016 | Morton et al. |
| 2017/0007359 A1 | 1/2017 | Kopelman et al. |
| 2017/0007360 A1 | 1/2017 | Kopelman et al. |
| 2017/0007361 A1 | 1/2017 | Boronkay et al. |
| 2017/0007366 A1 | 1/2017 | Kopelman et al. |
| 2017/0007386 A1 | 1/2017 | Mason et al. |
| 2017/0135792 A1 | 5/2017 | Webber |
| 2017/0135793 A1 | 5/2017 | Webber et al. |
| 2017/0165032 A1 | 6/2017 | Webber et al. |
| 2018/0360567 A1 | 12/2018 | Xue et al. |
| 2018/0368944 A1 | 12/2018 | Sato et al. |
| 2019/0000592 A1 | 1/2019 | Cam et al. |
| 2019/0000593 A1 | 1/2019 | Cam et al. |
| 2019/0021817 A1 | 1/2019 | Sato et al. |
| 2019/0029775 A1 | 1/2019 | Morton et al. |
| 2019/0046297 A1 | 2/2019 | Kopelman et al. |
| 2019/0099129 A1 | 4/2019 | Kopelman et al. |
| 2019/0125494 A1 | 5/2019 | Li et al. |
| 2019/0125497 A1 | 5/2019 | Derakhshan et al. |
| 2019/0152152 A1 | 5/2019 | O'Leary et al. |
| 2019/0175304 A1 | 6/2019 | Morton et al. |
| 2019/0262101 A1 | 8/2019 | Shanjani et al. |

(56) References Cited

U.S. PATENT DOCUMENTS

| | | |
|---|---|---|
| 2019/0298494 A1 | 10/2019 | Webber et al. |
| 2019/0314119 A1 | 10/2019 | Kopelman et al. |
| 2019/0343606 A1 | 11/2019 | Wu et al. |
| 2020/0000553 A1 | 1/2020 | Makarenkova et al. |
| 2020/0086553 A1 | 3/2020 | Mojdeh et al. |
| 2020/0100864 A1 | 4/2020 | Wang et al. |
| 2020/0100865 A1 | 4/2020 | Wang et al. |
| 2020/0100866 A1 | 4/2020 | Medvinskaya et al. |
| 2020/0155276 A1 | 5/2020 | Cam et al. |
| 2020/0188062 A1 | 6/2020 | Kopelman et al. |
| 2020/0214598 A1 | 7/2020 | Li et al. |
| 2020/0214801 A1 | 7/2020 | Wang et al. |
| 2020/0390523 A1 | 12/2020 | Sato et al. |
| 2021/0078357 A1 | 3/2021 | Venkatasanthanam et al. |
| 2021/0147672 A1 | 5/2021 | Cole et al. |

\* cited by examiner

SYSTEMS AND METHODS FOR INDUCTION OF BIOLOGICAL RESPONSE IN SUPPORT STRUCTURES OF THE TEETH AND REPOSITIONING THEREOF

CROSS-REFERENCE

This application is a continuation of U.S. patent application Ser. No. 15/051,390, filed Feb. 23, 2016, now U.S. Pat. No. 11,344,385, issued May 31, 2022, which claims the benefit of U.S. Provisional Application No. 62/119,728, filed Feb. 23, 2015, the disclosure of which is incorporated herein by reference in its entirety.

BACKGROUND

Prior methods and apparatus for aligning teeth can be less than ideal in at least some instances. While braces can be used to move teeth into alignment, braces can be cumbersome to wear and can require expertise to place on the subject. Also, complex movements can be difficult to achieve and orthodontic placement may less than ideally address the complex movements of several teeth in at least some instances.

Transparent shell appliances have been used to successfully move teeth. For example, a user can be provided with a series of transparent shell appliances. Each shell of the series of shells may correspond to a stage of the treatment. For example, a fourth shell in a series of ten shells may correspond to the fourth state of treatment. Although transparent shell appliances can be used to successfully reposition teeth, the transparent shell appliances can provide less than ideal results in at least some instances. For example, complex movements of teeth, such as to fill an extraction can be difficult to treat with transparent shell appliances. Also, in at least some instances, a wearer of a transparent shell appliance may not complete treatment, for example when teeth do not move sufficiently with the appliances and the user stops treatment. And, in at least some instances, the course of treatment may need to be reevaluated as the treatment is implemented, which may necessitate the manufacture of a second series of transparent shell appliances, prolonging treatment time.

In light of the above, it would be desirable to provide improved methods and apparatus for moving teeth to target positions with polymeric shell appliances. Ideally, such methods and apparatus would more accurately move teeth to target positions with improved biological response and a greater likelihood of completing treatment.

SUMMARY

Embodiments of the present disclosure provide a system for repositioning teeth comprising a set of primer appliances to be worn by the subject and a set of treatment appliances. The primer appliances can be provided to a subject as an initial, primer stage of the repositioning treatment, to prepare the local environment of the subject's teeth for further repositioning of the teeth by the treatment appliances during the treatment stage. The primer appliances may apply gentle force with strain to the periodontal ligament with one or more of compression, stretching or elongation to the periodontal ligament. The force with strain may be applied in one or more of many directions. The direction of the gentle force with strain to the periodontal ligament can be applied in the direction of desired movement of the teeth, which may correspond to the desired final position of the teeth, or away from the direction of desired tooth movement, such as outwardly. The gentle force with strain to the periodontal ligament can generate a biological response in the local environment of the teeth, including the production of one or more biochemical signals that may be related to the process of remodeling of oral tissue and bone. The gentle force with strain applied by the primer appliances may cause little or no repositioning of the teeth. Alternatively, the gentle force with strain applied by the primer appliances may reposition the teeth at a slower rate than the treatment appliances. The primer stage may be placed on the teeth for an initial treatment stage sufficient for achieving a desired biological response in the subject. The initial treatment stage can be for length of time within a range from about 3 weeks to about 8 weeks. Subsequent to the primer stage, treatment appliances may be provided to the subject to reposition the teeth. The treatment appliances may comprise one or more sets of treatment appliances, corresponding to one or more stages of treatment. The treatment appliances can be worn to reposition the teeth from an initial position to an end positon of a treatment stage. Through a plurality of treatment stages, a plurality of treatment appliances can be progressively worn and replaced so that the teeth are eventually repositioned by the set of treatment appliances to desired end positions. Priming the teeth for repositioning using the primer appliances can reduce the length of time for which each set of treatment appliances is worn by the subject, reduce the total length of time of the treatment, increase the total amount of possible tooth movement, decrease unwanted tooth movement, and improve the predictability and accuracy of tooth movement, hence allowing more subjects to successfully complete treatment.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION

Figure 1:
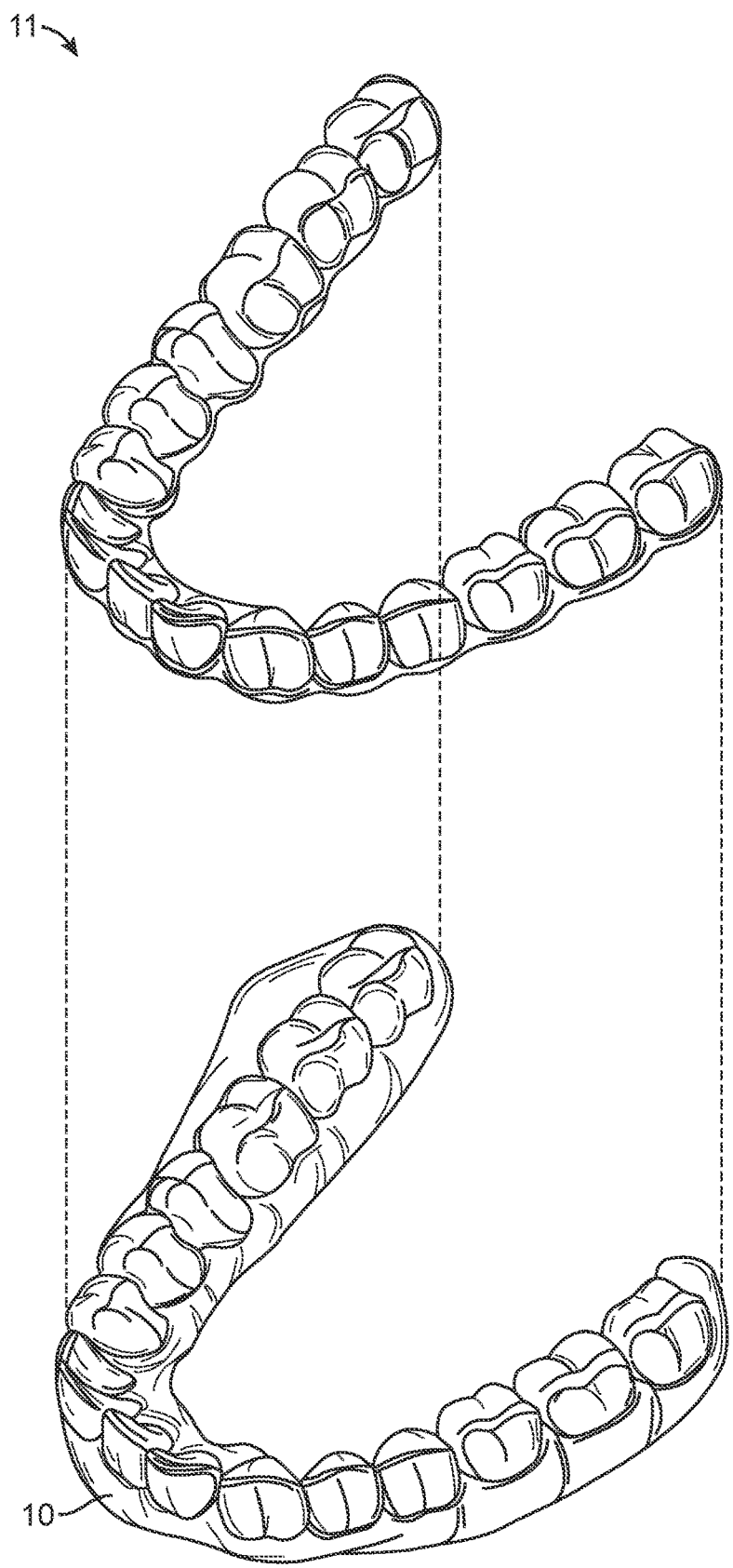
FIG. 1 illustrates a jaw together with an incremental positioning adjustment appliance according to embodiments of the present disclosure.

The present disclosure provides improved and more effective orthodontic systems and related methods for moving teeth to elicit a desired tooth movement and/or repositioning teeth into a desired arrangement. The methods and apparatus disclosed herein can be combined in many ways and used to treat one or more of many teeth conditions.

In some embodiments, certain methods and apparatus of aligning teeth with transparent shell appliances can rely on providing transparent shell appliances which may be worn progressively at substantially similar time intervals and which each may provide a rate of teeth movement that is substantially the same at each treatment stage. Work in relation to embodiments suggests that such an approach may provide less than ideal results in at least some instances as the biological response to wearing the shell appliances may not be consistent throughout the course of a treatment. For example, the teeth may be more resistant to repositioning in the first few stages of a treatment and as a result, the teeth may not be in the desired or planned position when these early stages are supposed to be completed. In at least some cases, this lag or discrepancy in treatment may prolong the total time required for treatment as the subject may opt to wear the early stage shell appliances for a longer period. In at least some cases, the lag or discrepancy may even necessitate a reevaluation of the treatment stages so that the treatment can begin anew at the present position of the teeth after the early treatment stages rather than the planned position. In some cases, a subject may decide not to complete treatment.

Work in relation to the present disclosure suggests that some treatment planning and force systems with polymeric shell appliances may not take into consideration lag of tooth position with respect to an intended position. Work in relation to embodiments also suggests that in some embodiments, the sequential positions of tooth positioning appliances may less than ideally address a higher resistance to movement of the teeth during the first few stages of appliance treatment. This higher resistance of the first few stages may be related to tissue elasticity, and the time allocated for biological response with the prior tooth positioning appliances may not be sufficient.

In one aspect, a method of repositioning teeth of a subject is provided. The method can comprise providing one or more primer appliances to be placed on a plurality of teeth of the subject to prepare support structures of the plurality of the teeth for repositioning, wherein the one or more primer appliances comprises a plurality of tooth receiving cavities shaped to provide an amount of force or torque to the plurality of teeth sufficient to induce a biological response of the support structures.

In many embodiments, the plurality of tooth receiving cavities is shaped to provide the amount of force or torque to the plurality of teeth without permanently moving the plurality of the teeth when the biological response has been induced and the plurality of teeth are ready for repositioning.

In many embodiments, the one or more primer appliances are provided during an intermediate portion of treatment before a movement phase of the plurality of teeth.

In many embodiments, the one or more primer appliances are provided for use after previous treatment comprising one or more of palatal expansion or mandibular repositioning and functional appliances configured to move the plurality of teeth are provided for use before the one or more primer appliances.

In many embodiments, the one or more primer appliances are provided for use after previous treatment comprising one or more of palatal expansion or mandibular repositioning and wherein functional appliances configured to move the plurality of teeth are provided for use after the one or more primer appliances.

In many embodiments, the method further comprises providing a plurality of appliances of an intermediate portion of treatment, the intermediate portion of the treatment comprising a plurality of repositioning stages of treatment. The method can further comprise providing one or more finishing appliances for use in a finishing stage of treatment. The intermediate portion of treatment can comprise providing a plurality of repositioning appliances of a plurality of repositioning stages in order to incrementally move the plurality of teeth toward final positions and one or more of the plurality of teeth can move between adjacent repositioning stages with a repositioning distance per unit time greater than a distance moved per unit time during a primer stage. In many embodiments, a plurality of positions of the plurality of tooth receiving cavities of the one or more finishing appliances comprises a plurality of final positions of the plurality of tooth receiving cavities corresponding to a plurality of final positions of the plurality of teeth.

In many embodiments, the one or more primer appliances are placed on the plurality of teeth for a time sufficient to induce the biological response of the support structures, the sufficient time comprising at least about two weeks.

In many embodiments, the one or more primer appliances are placed on the plurality of teeth for a time sufficient to induce the biological response of the support structures, the time within a range from about three weeks to about twelve weeks.

In many embodiments, the subject is an adult of age 18 or more years old, and the one or more primer appliances are placed on the plurality of teeth for a time sufficient to induce the biological response of the support structures, the time within a range from about three weeks to about twelve weeks.

In many embodiments, an amount of movement of the plurality of teeth upon completion of a primer portion of treatment with the one or more primer appliances is not sufficient to have permanently moved the plurality of teeth more than about half a distance from initial positions of the plurality of teeth prior to placement of the one or more primer appliances to positions of the plurality of tooth receiving cavities of the one or more primer appliances.

In many embodiments, each of the plurality of tooth receiving cavities is shaped to position a received tooth to provide the amount of force or torque to the plurality of the teeth without permanently moving the plurality of teeth when the biological response has been induced and the teeth are ready for repositioning.

In many embodiments, one or more of the plurality of tooth receiving cavities is shaped to displace one or more of the plurality of teeth in a pre-conditioning direction of the one or more primer appliances, the pre-conditioning direction away from a repositioning direction of an initial repositioning stage in order to facilitate movement in the repositioning direction with the initial repositioning stage.

In many embodiments, the one or more primer appliances are configured to move the plurality of teeth from a plurality of first positions to a plurality of second positions over a first amount of time, such movement from the plurality of first positions to the plurality of second positions corresponding to a first rate of movement. The method can further comprise providing a plurality of repositioning appliances of repositioning stages of treatment to reposition the plurality of teeth with a second rate of movement greater than the first rate of movement.

In many embodiments, the one or more primer appliances are configured to apply a controlled distribution of strain on a periodontal ligament of each tooth of the plurality of teeth received by the plurality of tooth receiving cavities of the one or more primer orthodontic appliances.

In many embodiments, the one or more primer appliances lower resistance of a tissue of the subject to the repositioning of the plurality of teeth with the repositioning appliances. The tissue can comprise a periodontal ligament.

In many embodiments, the one or more primer appliances produce a biological response in a local environment of the plurality of teeth. The biological response can comprise bone remodeling. The biological response can comprise one or more of a change in a concentration of a biochemical signal or a change in a cellular makeup of the local environment.

In many embodiments, the method further comprises placing the one or more primer appliances on the plurality of teeth; and placing one or more repositioning appliances on the plurality of teeth, wherein the one or more primer appliances are placed prior to the one or more repositioning appliances so as to reduce distortion of the one or more repositioning appliances when placed on the plurality of teeth.

In another aspect, a system for repositioning teeth of a subject is provided. The system can comprise one or more primer appliances to be placed on a plurality of teeth of the subject to prepare support structures of the plurality of teeth for repositioning, wherein the one or more primer appliances comprises a plurality of tooth receiving cavities shaped to provide an amount of force or torque to the plurality of teeth sufficient to induce a biological response of the support structures.

In many embodiments, the plurality of tooth receiving cavities is shaped to provide the amount of force or torque to the plurality of teeth without permanently moving the plurality of teeth when the biological response has been induced and the plurality of teeth are ready for repositioning.

In many embodiments, the system further comprises a plurality of appliances for an intermediate portion of treatment, the intermediate portion of the treatment comprising a plurality of repositioning stages of treatment. The system can further comprise one or more finishing appliances for use in a finishing stage of treatment.

In many embodiments, the plurality of appliances for the intermediate portion of treatment comprises a plurality of repositioning appliances of a plurality of corresponding repositioning stages in order to incrementally move the plurality of teeth toward final positions and wherein the plurality of repositioning appliances is configured to move one or more of the plurality of teeth between adjacent repositioning stages with a repositioning distance per unit time greater than a distance moved per unit time during a primer stage.

In many embodiments, a plurality of positions of the plurality of tooth receiving cavities of the one or more finishing appliances comprises a plurality of final positions of the plurality of tooth receiving cavities corresponding to a plurality of final positions of the plurality of teeth.

In many embodiments, the one or more primer appliances are configured to be placed on the plurality of teeth for a time sufficient to induce the biological response of the support structures, the time within a range from about three weeks to about twelve weeks.

In many embodiments, the one or more primer appliances are configured such that an amount of movement of the plurality of teeth upon completion of a primer portion of treatment with the one or more primer appliances is not sufficient to have permanently moved the plurality of teeth more than about half a distance from initial positions of the plurality of teeth prior to placement of the one or more primer appliances to positions of the plurality of tooth receiving cavities of the one or more primer appliances.

In many embodiments, each of the plurality of tooth receiving cavities is shaped to position a received tooth to provide the amount of force or torque to the plurality of the teeth without permanently moving the plurality of teeth when the biological response has been induced and the teeth are ready for repositioning.

In many embodiments, one or more of the plurality of tooth receiving cavities is shaped to displace one or more of the plurality of teeth in a pre-conditioning direction of the one or more primer appliances, the pre-conditioning direction away from a repositioning direction of an initial repositioning stage in order to facilitate movement in the repositioning direction with the initial repositioning stage.

In many embodiments, the one or more primer appliances are configured to move the plurality of teeth from a plurality of first positions to a plurality of second positions over a first amount of time, such movement from the plurality of first positions to the plurality of second positions corresponds to a first rate of movement, wherein a plurality of repositioning appliances of corresponding repositioning stages of treatment is configured to reposition the plurality of teeth with a second rate of movement greater than the first rate of movement.

In many embodiments, the one or more primer appliances are configured to apply a controlled distribution of strain on a periodontal ligament of each tooth of a plurality of teeth received by tooth receiving cavities of the one or more primer orthodontic appliances.

In many embodiments, the one or more primer appliances lower resistance of a tissue of the subject to the repositioning of the plurality of teeth with the repositioning appliances. The tissue can comprise a periodontal ligament.

In many embodiments, the one or more primer appliances produce a biological response in a local environment of the plurality of teeth. The biological response can comprise bone remodeling. The biological response can comprise one or more of a change in a concentration of a biochemical signal or a change in a cellular makeup of the local environment.

In another aspect, a system is provided comprising a processor comprising instructions to generate one or more primer appliances in response to user input and instructions to output data to manufacture the one or more primer appliances.

In another aspect, a method of planning an orthodontic treatment is provided. The method can comprise: receiving an initial digital data set representing an initial arrangement of a patient's teeth; generating a plurality of intermediate arrangements for successively repositioning the patient's teeth from the initial arrangement towards a target arrangement; determining geometries for one or more primer appliances comprising teeth receiving cavities shaped to prepare the patient's teeth for the repositioning from the initial arrangement towards the target arrangement, wherein the teeth receiving cavities of the one or more primer appliances are each shaped according to a first intermediate arrangement of the plurality of intermediate arrangements; and determining geometries for a plurality of treatment appliances comprising teeth receiving cavities shaped to successively reposition the patient's teeth from the initial arrangement towards the target arrangement, wherein the teeth receiving cavities of the plurality of treatment appliances are each shaped according to a respective intermediate arrangement of the plurality of intermediate arrangements following the first intermediate arrangement.

In many embodiments, the teeth receiving cavities of the one or more primer appliances are each shaped to move the patient's teeth at a first movement rate, and the teeth receiving cavities of the plurality of treatment appliances are each shaped to move the patient's teeth at a second movement rate, the second movement rate being greater than the first movement rate.

In many embodiments, the teeth receiving cavities of the one or more primer appliances are each shaped to move the patient's teeth by a first movement amount, and the teeth receiving cavities of the plurality of treatment appliances are each shaped to move the patient's teeth by a second movement amount, the second movement amount being greater than the first movement amount.

In many embodiments, the teeth receiving cavities of the one or more primer appliances are each shaped to apply force and/or torque to the patient's teeth without moving the patient's teeth, and the teeth receiving cavities of the plurality of treatment appliances are each shaped to apply force and/or torque to the patient's teeth that elicit movement of the patient's teeth.

In many embodiments, the one or more primer appliances comprise a plurality of primer appliances having the same teeth receiving cavity geometries. As used herein, "same teeth receiving cavity geometries" may mean that the teeth receiving cavities have the same size, shape, position, and/or orientation. For instance, teeth receiving cavities with the same geometry can have the same position and orientation relative to the patient's arch when the appliance is worn by the patient. The plurality of primer appliances can comprise three or more primer appliances having the same teeth receiving cavity geometries. The plurality of treatment appliances can each have different teeth receiving cavity geometries.

In many embodiments, the method further comprises generating instructions for fabricating the one or more primer appliances and the plurality of treatment appliances. The method can further comprise fabricating the one or more primer appliances and the plurality of treatment appliances based on the generated instructions.

In many embodiments, the teeth receiving cavities of the one or more primer appliances are each shaped to prepare the patient's teeth for the repositioning by lowering resistance of a tissue of the patient to the repositioning of the teeth. Lowering the resistance can comprise one or more of: initiating bone remodeling, initiating a change in one or more properties of a periodontal ligament, initiating a change in concentration of a biochemical signal, or initiating a change in a cellular makeup of a local environment of the teeth. The teeth receiving cavities of the plurality of treatment appliances can each be shaped to successively reposition the patient's teeth from the initial arrangement towards the target arrangement after the resistance of the tissue has already been lowered by the one or more primer appliances.

In another aspect, a method of planning an orthodontic treatment is provided. The method can comprise: determining a plurality of teeth to be repositioned from a first arrangement to a second arrangement during the orthodontic treatment; identifying a first subset of the plurality of teeth that have already been repositioned in a previous stage of the orthodontic treatment; identifying a second subset of the plurality of teeth that have not yet been repositioned in a previous stage of the orthodontic treatment; and determining a first movement rate for the first subset of the plurality of teeth and a second movement rate for the second subset of the plurality of teeth, wherein the first movement rate is greater than the second movement rate.

In many embodiments, the second movement rate is configured to prepare the second subset of the plurality of teeth for repositioning. The second movement rate can be configured to prepare the second subset of the plurality of teeth for repositioning by lowering resistance of a tissue of the patient to the repositioning of the plurality of teeth. Lowering the resistance can comprise one or more of: initiating bone remodeling, initiating a change in one or more properties of a periodontal ligament, initiating a change in concentration of a biochemical signal, or initiating a change in a cellular makeup of a local environment of the teeth.

In many embodiments, the method further comprises determining geometries for a plurality of appliances shaped to successively reposition the plurality of teeth from the first arrangement to the second arrangement. The plurality of appliances can each comprise a first set of tooth receiving cavities shaped to reposition the first subset of the plurality of teeth according to the first movement rate and a second set of tooth receiving cavities shaped to reposition the second subset of the plurality of teeth according to the second movement rate. In other words, a single appliance may have some tooth receiving cavities that are intended to reposition teeth and some tooth receiving cavities that are intended to prime teeth for repositioning. The second sets of tooth receiving cavities of the plurality of appliances can each comprise the same cavity geometries. The first sets of tooth receiving cavities of the plurality of appliances can each comprise different cavity geometries. The plurality of appliances can comprise three or more appliances. The method can further comprise generating instructions for fabricating the plurality of appliances and/or fabricating the plurality of appliances based on the generated instructions. The plurality of appliances can each be configured to be worn by a patient for the same amount of time.

In another aspect, a method of planning an orthodontic treatment is provided. The method can comprise: receiving an initial digital data set representing an initial arrangement of a patient's teeth; generating a plurality of intermediate arrangements for successively repositioning the patient's teeth from the initial arrangement towards a target arrangement; determining a first time period for repositioning the patient's teeth from the initial arrangement to a first intermediate arrangement of the plurality of intermediate arrangements; and determining a second time period for repositioning the patient's teeth from the first intermediate arrangement to a second, subsequent intermediate arrangement of the plurality of intermediate arrangement, wherein the first time period is longer than the second time period.

In many embodiments, the first time period is sufficiently long to prepare the teeth for repositioning.

In many embodiments, the first time period is sufficiently long to lower resistance of a tissue to the repositioning of the teeth. Lowering the resistance can comprise one or more of: initiating bone remodeling, initiating a change in one or more properties of a periodontal ligament, initiating a change in concentration of a biochemical signal, or initiating a change in a cellular makeup of a local environment of the teeth.

In many embodiments, the first time period is greater than or equal to about two weeks.

In many embodiments, the first time period is within a range from about two weeks to about twelve weeks.

In many embodiments, the first time period is at least three times longer than the second time period.

In many embodiments, a movement distance of the teeth from the initial arrangement to the first intermediate arrangement is the same as a movement distance of the teeth from the first intermediate arrangement to the second intermediate arrangement.

In many embodiments, the second intermediate arrangement is immediately subsequent to the first intermediate arrangement.

In many embodiments, the method further comprises determining a third time period for repositioning the patient's teeth from the second intermediate arrangement to a third, subsequent intermediate arrangement of the plurality of intermediate arrangement, wherein the third time period is equal to the second time period.

In many embodiments, the method further comprises determining geometries for a plurality of appliances shaped to successively reposition the plurality of teeth from the initial towards the target arrangement, wherein the plurality of appliances comprises a plurality of primer appliances shaped to reposition the patient's teeth from the initial arrangement to the first intermediate arrangement over the first time period and a plurality of treatment appliances shaped to reposition the patient's teeth from the first intermediate arrangement to the second intermediate arrangement over the second time period. The plurality of appliances can each be configured to be worn by the patient for the same amount of time. The plurality of primer appliances can comprise three or more primer appliances.

In another aspect, a system for planning an orthodontic treatment is provided. The system can comprise one or more processors configured to perform a method according to any of the embodiments herein.

As used herein and/or is a grammatical conjunction indicating that one or more of the elements connected with this grammatical conjunction may be provided. For example, A and/or B indicates one or more of A alone, or B alone, and combinations of A and B.

As used herein a "plurality of teeth" encompasses two or more teeth.

As used herein a primer stage encompasses an initial stage of treatment to condition support structures of teeth for movement.

As used herein a repositioning stage encompasses an intermediate stage of treatment in which one or more teeth is repositioned toward an intended final position upon completion of treatment.

As used herein a finishing stage of treatment encompasses a final stage of treatment in which one or more teeth positioning appliances having tooth receiving cavities shaped to move teeth to final positions is placed on the teeth.

The methods and apparatus provided herein can take into consideration the natural lag in response of a tooth during the early phase of tooth repositioning treatment. In many instances, during the first few stages of repositioning treatment, the tooth can exhibit a higher resistance to accomplishing movement. The higher resistance to movement may be due to the relatively high elasticity of the periodontal ligaments during the early stages of repositioning treatment. Alternatively or in combination, the higher resistance to movement may be due to the time required for the initiation of a biological response in the local environment of the tooth, the biological response enabling tooth movement in response to forces applied by appliances such as polymeric shell appliances. The biological response may comprise, for example, changes in concentrations of biochemical signals (e.g., cytokines, enzymes, growth factors, hormones, etc.) in the tissue or in the gingival crevicular fluid, or changes in the cellular makeup of the local environment (e.g., recruitment of cells, differentiation of cells). The biological response may be affected by cells within or around the periodontal ligament, such as osteocytes, osteoclasts, osteoblasts, fibroblasts, or circulating progenitor cells. Pre-loading one or more teeth with one or more primer aligners or appliances as described herein can provide sufficient time for changes in one or more properties of the periodontal ligaments, and thus lower the resistance to tooth movement. Further, the primer appliances can help produce and/or expedite the biological response involved in bone remodeling. Thus, the primer stage can provide easier and more predictable movements of the teeth during the subsequent treatment stage. After the primer stage, the treatment appliances may can be configured to move the teeth with greater incremental amounts.

Appliances having teeth receiving cavities that receive and reposition teeth, e.g., via application of force due to appliance resiliency, are generally illustrated with regard to FIG. 1. As illustrated, FIG. 1 shows one exemplary adjustment appliance 11 which is worn by the patient in order to achieve an incremental repositioning of individual teeth in the jaw 10. The appliance can include a shell (e.g., polymeric shell) having teeth-receiving cavities that receive and resiliently reposition the teeth. Similar appliances, including those utilized in the Invisalign® System, are described in numerous patents and patent applications assigned to Align Technology, Inc. including, for example in U.S. Pat. Nos. 6,450,807, and 5,975,893, as well as on the company's website, which is accessible on the World Wide Web (see, e.g., the URL "align.com").

As set forth in the prior applications, an appliance can be designed and/or provided as part of a set or plurality of appliances and treatment can be administered according to a treatment plan. In such embodiments, each appliance may be configured so that one or more tooth-receiving cavities have a geometry corresponding to an intermediate or final tooth arrangement intended for the appliance. Appliance geometries can be further designed or modified (e.g., modified to accommodate or operate in conjunction with tooth attachments) so as to apply a desired force or system of forces to the patient's teeth and elicit a desired tooth movement and gradually reposition teeth to an intended arrangement. The patient's teeth can be progressively repositioned from their initial tooth arrangement to a final tooth arrangement by placing a series of incremental position adjustment appliances over the patient's teeth. The adjustment appliances can be generated all at the same stage or in sets or batches, e.g., at the beginning of a stage of the treatment, and the patient wears each appliance until the pressure of each appliance on the teeth can no longer be felt. A plurality of different appliances (e.g., set) can be designed and even fabricated prior to the patient wearing any appliance of the plurality. At that point, the patient can replace the current adjustment appliance with the next adjustment appliance in the series until no more appliances remain. The appliances may be not affixed to the teeth and the patient may place and replace the appliances at any time during the procedure. The final appliance or several appliances in the series may have a geometry or geometries selected to overcorrect the tooth arrangement, i.e., have a geometry which can (if fully achieved) move individual teeth beyond the tooth arrangement which has been selected as the "final." Such overcorrection may be desirable in order to offset potential relapse after the repositioning method has been terminated, i.e., to permit movement of individual teeth back toward their pre-corrected positions. Over-correction may also be beneficial to speed the rate of correction, i.e., by having an appliance with a geometry that is positioned beyond a desired intermediate or final position, the individual teeth will be shifted toward the position at a greater rate. In such cases, the use of an appliance can be terminated before the teeth reach the positions defined by the appliance.

Orthodontic appliances, such as illustrated in FIG. 1, can impart forces to the crown of a tooth and/or an attachment positioned on the tooth at each point of contact between a tooth receiving cavity of the appliance and received tooth and/or attachment. The magnitude of each of these forces and their distribution on the surface of the tooth may determine the type of orthodontic tooth movement which results. Types of tooth movements can be conventionally delineated as extrusion, intrusion, rotation, tipping, translation and root movement. Tooth movement of the crown greater than the movement of the root can be referred to as tipping. Equivalent movement of the crown and root can be referred to as translation. Movement of the root greater than the crown can be referred to as root movement.

As described above, a patient's teeth can be generally progressively repositioned according to a treatment plan. Exemplary methods for treatment plan design, as well as appliance design and fabrication are described further below. Typically, appliance and/or treatment plan design can optionally, though not necessarily, be accomplished using various computer-based applications. It will be recognized that appliance design and fabrication is not limited to any particular method and can include various computer and noncomputer-based methodologies.

Treatment planning, according to embodiments of the present disclosure, is described. Patient data can be collected and analyzed, and specific treatment steps specified and/or prescribed. In many embodiments, a treatment plan can be generated and proposed for a dental practitioner to review. The dental practitioner can accept or request modifications to the treatment plan. Once the treatment plan is approved, manufacturing of appliance(s) can begin. Digital treatment plans can be generated with 3-dimensional orthodontic treatment planning tools such as software provided by Align Technology, Inc. or other software available from eModels and OrthoCAD, among others. These technologies can allow the clinician to use the actual patient's dentition as a starting point for customizing the treatment plan. The software technology of Align Technology, Inc., may use a patient-specific digital model to plot a treatment plan, and then uses a scan of the achieved or actual treatment outcome to assess the degree of success of the outcome as compared to the original digital treatment plan as discussed in U.S. patent application Ser. No. 10/640,439, filed Aug. 21, 2003 and U.S. patent application Ser. No. 10/225,889 filed Aug. 22, 2002.

Examples of polymeric shell appliances suitable for incorporation in accordance with embodiments of the present disclosure suitable are described in U.S. application Ser. No. 12/623,340, filed on Nov. 20, 2009, published as US 2010/0138025 on Jun. 3, 2010, entitled "Orthodontic systems and methods including parametric attachments," and U.S. application Ser. No. 13/865,091, filed on Apr. 17, 2013, published as US 2013/0230818, entitled "Method and system for optimizing dental aligner geometry," the entire disclosures of which are incorporated herein by reference.

In many instances and for many movements, a plain polymeric shell appliance may work well. Features can be added when there are difficult movements such as significant rotation, extrusion, or root movement. Even so, the plain polymeric shell appliance itself can still create the majority of force and moment to move the tooth. The primer appliances as described herein may have structures such as power ridges to enhance tooth movement and can be shaped to receive features such as attachments placed on the teeth. Alternatively, the primer appliances as described herein may not have structures such as power ridges and may not be shaped to receive features such as attachments placed on the teeth.

A manufacturing process for a plain polymeric shell appliance may be as follows. First, initial and final teeth positions may be acquired and a movement path may be generated of all the teeth. Then, additional features such as attachments, dimples, and ridges may be added to the teeth. A 3D printer may then be used to print the physical mold of the teeth, jaw, and other features. A thin plastic sheet may be thermal formed on the mold. The gingival line may be cut and the polymeric shell appliance may be removed from the mold. Finally, the plain polymeric shell appliance may be cleaned and packaged.

The appliance as described herein can be formed in one or more of many ways and may comprise a machined piece of material, a thermoformed material, a 3D printed material, and combinations thereof, for example.

Although reference is made to an appliance comprising a polymeric shell appliance, the embodiments disclosed herein are well suited for use with many appliances that receive teeth, for example appliances without one or more of polymers or shells. The appliance can be fabricated with one or more of many materials such as metal, glass, reinforced fibers, carbon fiber, composites, reinforced composites, aluminum, biological materials, and combinations thereof for example. The appliance can be shaped in many ways, such as with thermoforming or direct fabrication as described herein, for example. Alternatively or in combination, the appliance can be fabricated with machining such as an appliance fabricated from a block of material with computer numeric control machining.

Figure 2:
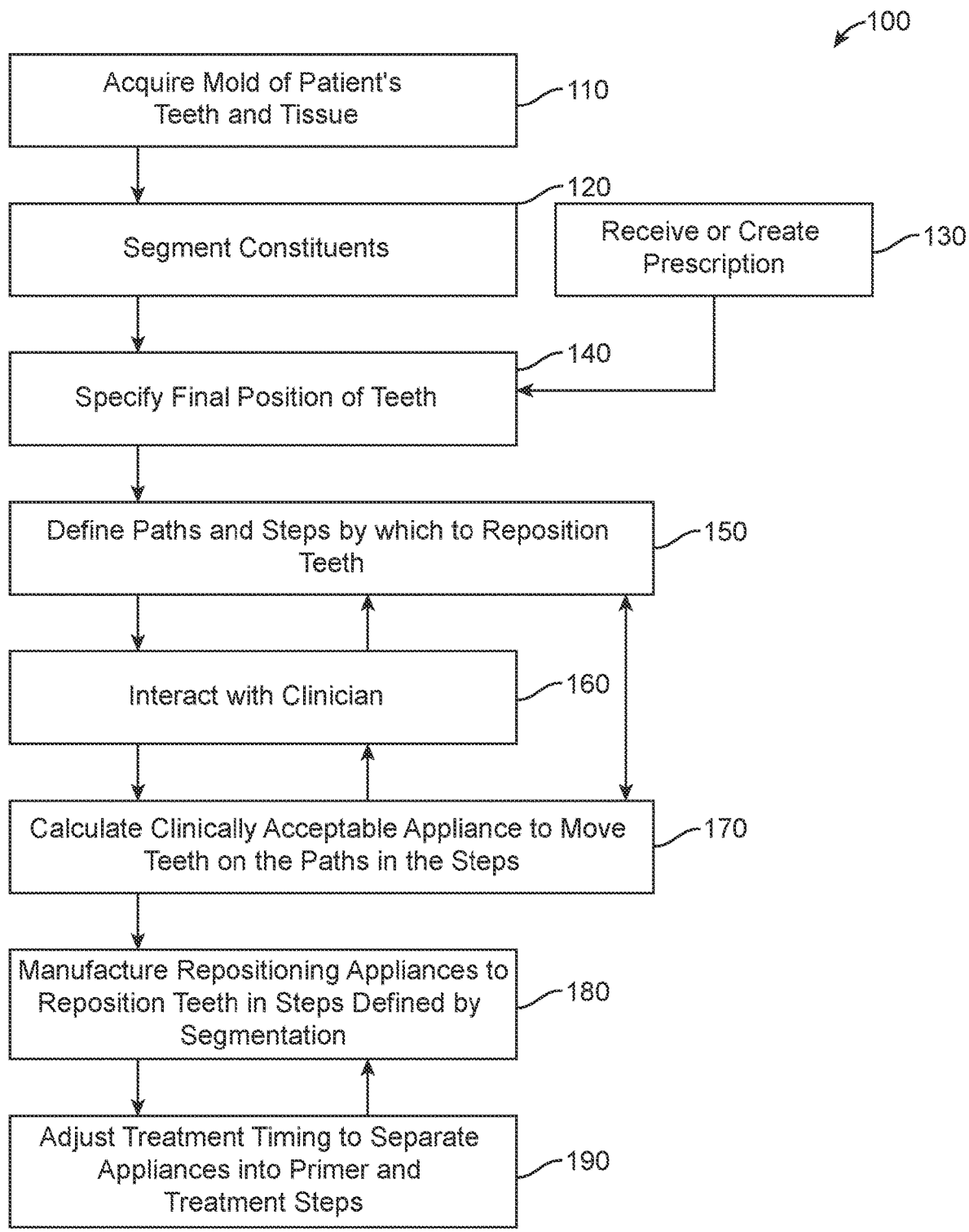
FIG. 2 is a flowchart of a process of specifying a course of treatment according to embodiments of the present disclosure.

FIG. 2 illustrates the general flow of an exemplary process 100 for generating a treatment plan or defining and generating repositioning appliances for orthodontic treatment of a patient. The process 100 can incorporate optimized and/or customized attachments and design thereof as described in U.S. patent application Ser. No. 12/623,340, which is incorporated herein by reference. The process 100 may include the methods and is suitable for optimized and/or customized attachments and apparatus, of the present disclosure, as will be described. The computational steps of the process can be advantageously implemented as computer program modules for execution on one or more conventional digital computers.

As an initial step, a mold or a scan of patient's teeth or mouth tissue is acquired (step 110). This step 110 can involve taking casts of the patient's teeth and gums and may in addition or alternately involve taking wax bites, direct contact scanning, x-ray imaging, tomographic imaging, sonographic imaging, and other techniques for obtaining information about the position and structure of the teeth, jaws, gums and other orthodontically relevant tissue. From the data so obtained, a digital data set can be derived that represents the initial (that is, pretreatment) arrangement of the patient's teeth and other tissues.

The initial digital data set, which may include both raw data from scanning operations and data representing surface models derived from the raw data, is processed to segment the tissue constituents from each other (step 120). In particular, in this step 120, data structures that digitally represent individual tooth crowns can be produced. Advantageously, digital models of entire teeth can be produced, including measured or extrapolated hidden surfaces and root structures as well as surrounding bone and soft tissue.

The desired final position of the teeth—that is, the desired and intended end result of the orthodontic treatment or phase of orthodontic treatment—can be received from a clinician in the form of a prescription, can be calculated from basic orthodontic principles, or can be extrapolated computationally from a clinical prescription (step 130). With a specification of the desired final positions of the teeth and a digital representation of the teeth themselves, the final position and surface geometry of each tooth can be specified (step 140) to form a complete model of the teeth at the desired end of treatment. Generally, in this step 140, the position of every tooth can be specified. The result of this step may be a set of digital data structures that represents an orthodontically correct repositioning of the modeled teeth relative to presumed-stable tissue for the desired phase of orthodontic treatment. The teeth and tissue are both represented as digital data.

Having both a beginning position and a final position for each tooth, the process can next define a tooth path for the motion of each tooth (step 150). In some embodiments, the tooth paths can be optimized in the aggregate so that the teeth are moved in the quickest fashion with the least amount of round-tripping to bring the teeth from their initial positions to their desired final positions. Round-tripping can be defined as any motion of a tooth in any direction other than directly toward the desired final position. Round-tripping can sometimes be necessary to allow teeth to move past each other. The tooth paths can be segmented. The segments can be calculated so that each tooth's motion within a segment can stay within threshold limits of linear and rotational translation. In this way, the end points of each profile segment can constitute a clinically viable repositioning, and the aggregate of segment end points constitute a clinically viable sequence of tooth positions, so that moving from one point to the next in the sequence does not result in a collision of teeth.

The threshold limits of linear and rotational translation are initialized, in one implementation, with default values based on the nature of the appliance to be used. More individually tailored limit values can be calculated using patient-specific data. The limit values can also be updated based on the result of an appliance-calculation (step 170), which may determine that at one or more points along one or more tooth paths, the forces that can be generated by the appliance on the then-existing configuration of teeth and tissue is incapable of effecting the repositioning that is represented by one or more tooth profile segments. With this information, the sub-process defining segmented paths (step 150) can recalculate the paths or the affected sub-paths.

At various stages of the process, and in particular after the segmented paths have been defined, the process can, and generally will, interact with a clinician responsible for the treatment of the patient (step 160). Clinician interaction can be implemented using a client process programmed to receive tooth positions and models, as well as path information from a server computer or process in which other steps of process 100 are implemented. The client process can be advantageously programmed to allow the clinician to display an animation of the positions and paths and to allow the clinician to reset the final positions of one or more of the teeth and to specify constraints to be applied to the segmented paths. If the clinician makes any such changes, the sub-process of defining segmented paths (step 150) can be performed again.

The segmented tooth paths and associated tooth position data can be used to calculate clinically acceptable appliance configurations (or successive changes in appliance configuration) that will move the teeth on the defined treatment path in the steps specified by the profile segments (step 170). Each appliance configuration may represent a step along the treatment path for the patient. The steps can be defined and calculated so that each discrete position can follow straight-line tooth movement or simple rotation from the tooth positions achieved by the preceding discrete step and so that the amount of repositioning required at each step involves an orthodontically optimal amount of force on the patient's dentition. As with the path definition step, this appliance calculation step can include interactions and even iterative interactions with the clinician (step 160). The operation of process steps implementing this step 170 in a plurality of sub-steps is described more fully in U.S. patent application Ser. No. 12/623,340, which is incorporated herein by reference.

Having calculated appliance definitions, the process 100 can proceed to the manufacturing step (step 180) in which appliances defined by the process are manufactured, or electronic or printed information is produced that can be used by a manual or automated process to define appliance configurations or changes to appliance configurations.

With the set of orthodontic appliances manufactured, the timing parameters of the treatment can be adjusted to separate the set of orthodontic appliances into a set of primer orthodontic appliances and a set of treatment orthodontic appliances (step 190). Additional orthodontic appliances may be manufactured depending on the needs of the priming and treatment stages. For example, the set of primer orthodontic appliances may comprise a plurality of appliances corresponding to the primer stage of treatment, which may be manufactured and worn as the primer appliances.

In some subjects, the movement and repositioning of the teeth may not be as responsive to treatment in early stages of the treatment course. For example, in mature adults of ages 19 and older, teeth may not move significantly in the first 3 to 8 weeks of treatment, in contrast to younger subjects whose teeth may experience movement within an hour of the beginning of treatment. The time lag between the initiation of treatment and the movement of the teeth may be due to the time required for the initiation of a biological response to the forces applied by the orthodontic appliances. For example, before bone remodeling can occur, the concentrations of many biochemical signals or messengers (e.g., cytokines, growth factors, enzymes, hormones, etc.) in the local environment of the teeth may need to change, or the recruitment and/or differentiation of appropriate cell types may need to occur. Accordingly, accounting for the initial time lag in designing the treatment stages can help ensure that the teeth of the subject move through the later stages of the treatment course with appropriate speed and accuracy. The primer orthodontic appliances may be worn to prepare the teeth and related anatomy, particularly the periodontal ligaments, for teeth movement and repositioning. The primer appliances may be configured to compress the periodontal ligament and the surrounding supporting structure (e.g., gingiva, alveolar bone), in order to elicit the appropriate biological response. After the primer orthodontic appliances have been worn for an appropriate length of time, the biological response necessary for enabling bone remodeling and subsequent movement of the teeth may be established, and the periodontal ligaments may be less viscous, for example. In this manner, the later worn treatment orthodontic appliances may accurately and effectively move and reposition the teeth. For example, fewer attachments to the teeth and/or less force may be applied to move and reposition teeth which have been primed as such. Further, the primer appliances can improve the predictability of tooth movement during the course of treatment, reducing the need to adjust planned movement paths and/or manufacture new treatment appliances to compensate for unpredicted movements. In many embodiments, the increments for progressively replacing the treatment orthodontic appliances may be decreased by using primer appliances. The primer appliances can thus shorten the length of the treatment as a whole.

Additionally, in some embodiments, application of treatment appliances to a subject's teeth without first using one or more primer appliances to prepare the teeth may result in distortion of the treatment appliances. Distortion of treatment appliances may occur, for example, if the appliances are worn while the teeth are exhibiting higher resistance to movement and thus lag behind the planned movement for the appliances. For instance, if a first treatment appliance corresponding to a first treatment stage is worn, then a second treatment appliance corresponding to a second treatment stage is worn even though the teeth have not progressed correspondingly, distortion (e.g., deformation, deflection, and/or warping) of the second treatment appliance may occur. Distortion may result in alteration of the contact points between the appliance and tooth and may reduce the effectiveness of the appliance in producing the optimal force system for tooth movement. The extent of distortion may worsen as successive treatment appliances are placed, resulting in further deviations from the planned application of forces and intended tooth movement trajectories. By using primer appliances to prepare the subject's teeth for movement, lag between the intended and achieved tooth movements during the treatment phase may be reduced or eliminated, and distortion of treatment appliances may be decreased.

In some embodiments, a primer appliance is shaped to move the teeth at a lower movement rate compared to a treatment appliance. Alternatively or in combination, a primer appliance can be shaped to move the teeth by a movement amount less than that of a treatment appliance. A treatment appliance may be designed to move teeth after resistance of the teeth and/or intraoral tissues to movement has already been reduced by use of primer appliance. For instance, the amount and/or rate of movement achieved by a treatment appliance may be greater if the treatment appliance is used after priming, and less if the treatment appliance is used without priming.

Although the above steps show the method 100 for generating a treatment plan or defining and generating repositioning appliances for orthodontic treatment of a patient in accordance with many embodiments, a person of ordinary skill in the art will recognize many variations based on the teaching described herein. The steps may be completed in a different order. Steps may be added or deleted. Some of the steps may comprise sub-steps. Many of the steps may be repeated as often as beneficial to the treatment.

One or more of the steps of the method 100 may be performed with circuitry of a computing system as described herein, for example one or more of a processor or logic circuitry of a computer or a computerized system. The circuitry may be programmed to provide one or more of the steps of the method 100, and the program may comprise program instructions stored on a computer readable memory or programmed steps of the logic circuitry, for example.

In some embodiments, an orthodontic treatment plan can include multiple stages, such as a primer stage and a treatment stage. The primer stage may be used to prepare teeth for movement (e.g., by lowering tissue resistance to repositioning), while the treatment stage may be used to actually effect the planned movement after application of the primer stage. In some embodiments, planning an orthodontic treatment involves determining a plurality of intermediate tooth arrangements for repositioning teeth from an initial arrangement towards a target arrangement. A first time period for repositioning the patient's teeth from the initial arrangement to a first intermediate arrangement can be determined, and this time period may correspond to the primer stage of the treatment. A second time period for repositioning the teeth from the first intermediate arrangement to a second intermediate arrangement can be determined, and this time period may correspond to a first sub-stage of the treatment stage. Additional time periods can be determined for repositioning the teeth to each subsequent intermediate arrangement, e.g., a third time period for repositioning teeth from the second intermediate arrangement to a third intermediate arrangement, etc. The first time period (the primer stage) may be longer than each of the subsequent time periods (each treatment sub-stage) in order to adequately prepare the teeth for repositioning as described herein, e.g., at least three times longer. In some embodiments, the primer stage is longer than about two weeks, or within a range from about two weeks to about twelve weeks. The planned movement distance per tooth during the primer stage may be the same as the planned movement distance for each treatment sub-stage, such that the teeth are intended to be moved at a slower rate during the primer stage than the treatment stage. In some embodiments, lower movement rates during the primer stage are achieved by using multiple primer appliances having the same cavity geometries (e.g., three or more primer appliances). The primer appliances may each be worn for the same period of time as the treatment appliances (e.g., one to two weeks per appliance), such that providing multiple primer appliances with the same geometries results in a lower planned movement rate compared to the treatment appliances.

Figure 3:
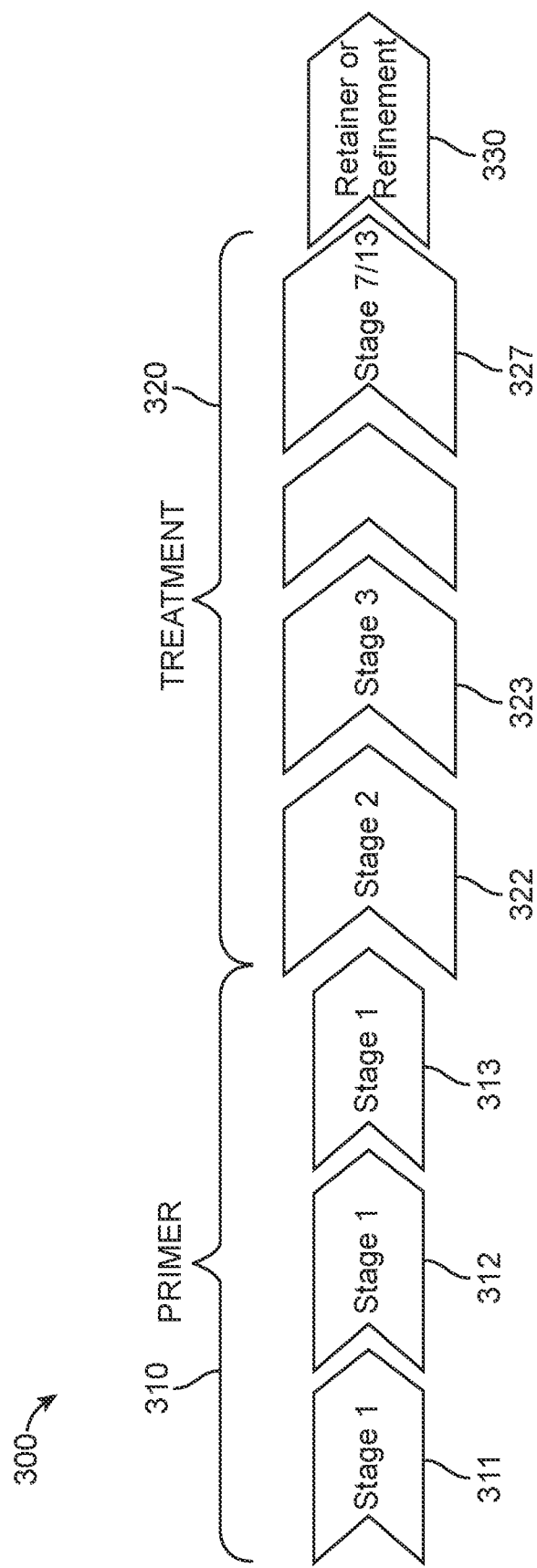
FIG. 3 is a schematic of a treatment course for moving and repositioning teeth according to embodiments of the present disclosure.

FIG. 3 shows an exemplary schedule 300 having a primer stage 310 and a treatment stage 320. This figure shows primer aligners, treatment aligners, finishing aligners, and retainers such as Vivera®, for example. The primer stage 310 may comprise a first primer appliance 311, a second primer appliance 312, and a third primer appliance 313. Each of the primer appliances 311, 312, 313 may correspond to a first stage of the treatment course. Each of the primer appliances 311, 312, 313 may be worn for a first period of time, such as about 10 to 18 days, or such as about two weeks. Alternatively, the primer stage 310 may comprise the same primer appliance worn for the complete duration of the primer stage, for example about 3 to about 8 weeks. The configuration of the primer appliances and/or the total duration of the primer stage may be determined based on one or more of age, race, ethnicity, tooth shape, and periodontal condition of the subject.

Although FIG. 3 makes reference to an exemplary schedule 300 in accordance with an example of a method and a plurality of aligners as described herein, the schedule 300 can be modified in many ways. The primer appliance can be applied somewhere in the middle of the treatment. For example, with segmental or with mandibular repositioning appliances, the primer stage can be provided after the mandibular repositioning appliance, for example. The primer appliances can be used with one or more of many forms of tooth movement, such as alternatively or in combination with minor tooth movement, for example. The primer appliance can be applied at one or more of prior to a difficult stage of treatment, with a change in treatment plan, or a start of a new section of treatment, for example. The primer appliance concept as described herein can be provided later in treatment, such as after mandibular advancement, or palatal expansion, for example. The primer appliance concept as described herein can be applied to the initiation of dental movement with one or more of many forms of dental treatment.

The first stage of the treatment course may or may not comprise a part of the programmed tooth movement path, such as a path defined in step 150 of the method 100 described herein. In many embodiments, the first stage does not comprise the programmed path. In many embodiments, the first stage is configured to provide compression in a direction favorable for achieving the desired final position of a tooth, such as compression in a direction of intended tooth movement. The appropriate amount of compression to be provided to each tooth for achieving the desired final position of the tooth may be determined using finite element analysis (FEA). In many embodiments, the first stage of the treatment course is configured to apply compression to the periodontal ligaments sufficient to generate a biological response in the local environment of the tooth. For example, the primer appliance can place a loading on a tooth to provide about 0.02 mm to about 0.3 mm, or about 0.2 mm, of movement. The primer appliances may be configured to control the strain distribution on the periodontal ligament of each tooth. In some embodiments, the primer appliances may be configured to apply compression to only a portion of the teeth. For example, the primer appliances may be configured to apply compression to only one or more selected teeth in each quadrant of the mouth, and a partial compression may be sufficient to elicit a biological response in local environment of the teeth.

The total duration of the primer stage may be tailored for each subject and/or adjusted during the treatment, such that the primer appliances are provided for a sufficient length of time to precondition the teeth, in order to begin moving the teeth with movement stages. In order to determine whether teeth have begun moving, the gingival crevicular fluid of the subject may be tested at intervals, for example at every 2 weeks, to determine the concentration of one or more relevant biochemical signals, such as tissue necrosis factor beta (TNF-$\beta$), insulin-like growth factor (IGF), macrophage colony stimulating factor (M-CSF), and parathyroid hormone (PTH), among others. Alternatively or in combination, the position of the subject's teeth may be tracked visually throughout the primer stage to identify movement; for example, the presence of a separation around the incisal edges may indicate that the teeth have not begun to move and that the primer stage may be extended. Indications by the subject regarding soreness or pain when the appliance has been removed may indicate when movement has begun.

The subject can provide information and can be instructed to determine when the primer stage has been worn for a sufficient amount of time and the supporting structures of the teeth are conditioned for treatment. When the primer stage appliance is initially placed on the teeth, the subject may feel a slight discomfort. As the support tissues are conditioned, the slight discomfort diminishes with the primer appliance on the teeth. However, when the primer appliance is removed, the subject may feel discomfort. This slight feeling of discomfort with the primer appliance removed and the teeth in an unloaded configuration is an indication that the support structures of the teeth have been conditioned for teeth movement. The primer stage can be stopped and the intermediate stage started with the next appliance in the series. The subjective response of the subject can be combined with one or more other indicia of completion of the primer stage as described herein.

Optionally, the first stage of the treatment course may comprise different sub-stages, such that each primer appliance (e.g., 311, 312, 313) corresponding to a sub-stage is configured to apply a different distribution of forces. While in many embodiments the primer stage does not comprise a portion of the programmed movement path of a tooth, the forces applied by the primer appliances may cause some movement in one or more teeth. Such movement may change the direction in which compression should be applied in order to achieve the desired final position of a tooth. Accordingly, primer appliances may be adjusted during the primer stage to ensure that the strain distribution placed by the appliances is appropriate for achieving the desired final position.

The treatment stage 320 may comprise a first treatment appliance 322, a second treatment appliance 323, and a finishing treatment appliance 327 of the final stage of movement, for example. The first treatment appliance 322 may correspond to the second stage of the treatment course, the second treatment appliance 323 may correspond to the third stage of the treatment course, and so forth. Each of the treatment appliances 322, 323, and 327 may be worn for a second period of time, which may be shorter than the first period of time for which the primer appliances are worn. For example, each of the treatment appliances may be worn for about 7 to 14 days, or about 10 days. By contrast, in treatment courses without a primer stage, each treatment appliance may often be worn for a longer period, usually two weeks.

After the treatment course is completed, the subject may be provided with a set of orthodontic refinement appliances 330 to further move or reposition the teeth such as to more closely match the final tooth arrangement desired or provide an over-correction as described above. Refinement appliances 330 may be provided, for example, if the position of the teeth at the end of the planned course of treatment deviates from the final tooth arrangement desired or if an over-correction of the teeth is appropriate. These orthodontic refinement appliances 330 may be designed and manufactured with the process 100 described above. Alternatively or in combination, the refinement appliances may comprise one or more retainers such as Vivera® clear polymeric shell retainers commercially available from Align Technology of Santa Clara, California, for example. In some embodiments, a retainer includes tooth receiving cavities shaped to maintain the patient's teeth in a desired arrangement, e.g., the final arrangement resulting from orthodontic treatment. The tooth receiving cavity geometries (e.g., size, shape, position, and/or orientation) of a retainer may be the same as or similar to the tooth geometries of the desired tooth arrangement. Accordingly, the retainer may be designed to maintain its shape while a tooth tries to return to a former position. In some embodiments, a retainer is used after the teeth have already been repositioned in order to maintain teeth in their current locations (e.g., at the end of the treatment plan), while primer appliances are used prior to tooth repositioning in order to prepare teeth for movement away from their current locations (e.g., at the beginning of the treatment plan). Although certain embodiments of the primer appliances described herein may not produce tooth movements when worn, such primer appliances can still apply sufficient forces to the teeth to elicit a biological response that facilitates repositioning. In some embodiments, the forces applied by a retainer, if any, are not sufficient to elicit such a biological response and thus would not prepare the teeth for repositioning.

Figure 4:
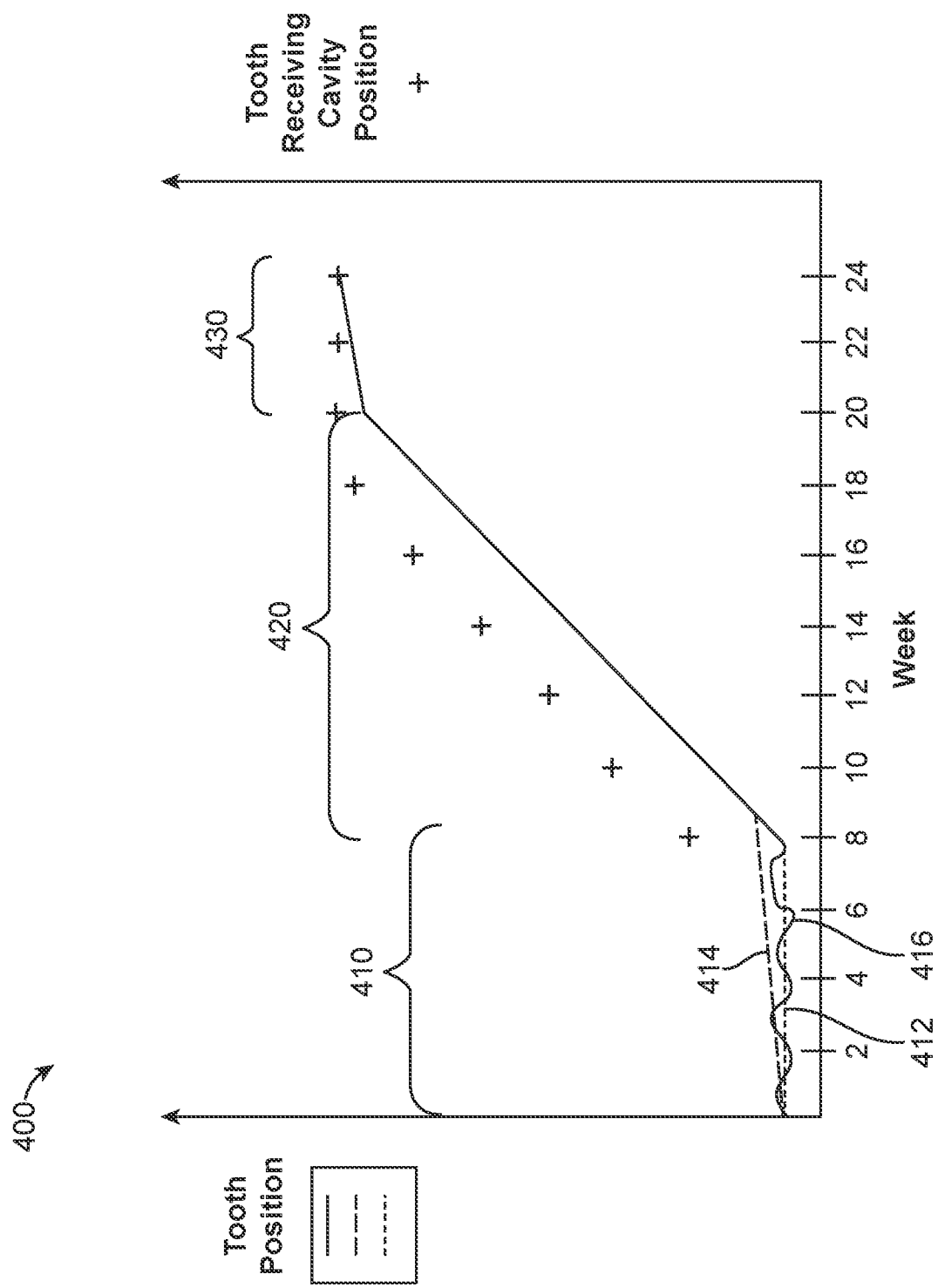
FIG. 4 shows a graph of tooth position over the course of a treatment according to embodiments of the present disclosure.

FIG. 4 shows an exemplary tooth movement profile 400 of a tooth position over the course of a treatment. Although a movement profile 400 of a single tooth is shown, a person of ordinary skill in the art will recognized that many teeth can be moved similarly with an appliance as described herein. The tooth position can change over time in order to move the tooth along a path from an initial position to a final position in accordance with stages of the treatment and the tooth receiving cavities of a series of appliances as described herein. The treatment profile comprises an initial primer portion 410 in which the tooth and support tissue is primed for movement as described herein. The treatment profile comprises an intermediate portion 420, and a finishing portion 430. The majority of tooth movement occurs with the intermediate portion 420 of the treatment profile. The finishing portion 430 of the treatment allows the tooth to move to the final target position of the tooth.

The plurality of appliances used to treat the subject can be configured to move the teeth with the tooth movement profile 400. Each of the plurality of tooth receiving cavities comprises a shape profile to receive the tooth and a corresponding tooth receiving cavity position. The tooth receiving cavity position corresponds to a position of the tooth at which forces to the tooth are substantially decreased. The tooth receiving cavity position may correspond to the position to which the tooth would move if the tooth had no resistance to mechanical forces of the appliance, for example. For the primer treatment stages, the position of the tooth receiving cavity can be within a range from about 0.02 to about 1 mm from the initial position of the tooth, for example. The range can be from about 0.04 to about 0.5 mm, for example. The primer treatment stage can be provided with a plurality of appliances, or a single appliance provided on the teeth for a greater amount of time than appliances of the intermediate portion of the treatment. Upon completion of the primer portion of the treatment, appliances of the intermediate portion of the treatment are provided. The positions of the tooth receiving cavities of the intermediate portion of the treatment lead the tooth positions as shown. The tooth receiving cavities of the series of appliances are arranged to progressively reposition teeth with a plurality of incremental positions. With the finishing portion of the treatment, the tooth is allowed to move to the position of the tooth receiving cavity. The speed of tooth movement during the finishing stage can be smaller than the intermediate stage in order to allow the tooth to move into the position of the tooth receiving cavity.

The treatments with primer appliances as described herein are well suited for use with one or more of many types of subjects. The appliances are well suited for use with children and adults, for example. Although the teeth of some children may move more quickly than the teeth of some adults, at least some children may have teeth and supporting structures benefiting from the primer appliances as disclosed herein. Alternatively or in combination, the primer appliances as described herein can be used to treat adults, of age 18 years old or more, for example. The primer appliance as described herein can be configured for placement on the teeth for a suitable amount of time to promote movement of the teeth as described herein, for example at least about two weeks.

Each of the treatment portions may comprise tooth movement within an appropriate range as described herein. The amount of movement within a range from about 0.02 to about 0.3 mm during the primer stage can be provided over a period of time of at least about two weeks, such as from about three to about ten weeks, for example. The amount of displacement of the primer stage per week can be within a range from about 0.002 mm per week to about 0.75 mm per week, for example. With the intermediate phase, for each stage the teeth can move within a range from about 0.1 mm to about 0.3 mm, for example. The rate of tooth movement can be within a range from about 0.05 mm per week to about 0.5 mm per week, for example. With the finishing stage, the appliance can remain on the teeth for a sufficient amount of time to allow the teeth to move to the final position, and the rates can be less than the intermediate stage. With the finishing stage the rate of tooth movement can range from about 0.002 mm per week to about 0.1 mm per week, for example.

The primer, intermediate and finishing portions of the treatment can be provided to a patient in one or more of many ways. For example, a plurality of appliances can be provided to the subject, in which each appliance provides a similar amount of tooth movement in relation to other appliances. The primer stage of treatment may comprise placing the first appliance on the teeth for an appropriate amount of time to generate a biological softening response. The first appliance can be placed on the teeth for an amount of time to provide a biological response as described herein, such as softening of the periodontal ligament and related changes, for example. The amount of time can range from about 3 weeks to about 12 weeks, for example. The intermediate treatment can be provided with a plurality of appliances comprising the intermediate treatment stages. The next appliance of the series can be provided in response to preconditioning of the support tissue with the first appliance. The finishing portion of the treatment can be provided with the last appliance of the series, for example. The last appliance in the series can be placed on the teeth for an amount of time greater than each of the appliances of the intermediate portion of the treatment, for example.

The primer portion of the treatment may comprise placing an appliance configured to provide appropriate displacement of the teeth to prime the teeth for movement as described herein. The primer portion of the treatment may comprise sequentially placing a plurality of primer appliances having the same or similar tooth receiving cavity geometries (e.g., positions and orientations), such as three or more primer appliances having the same or similar cavity geometries. In some embodiments, a plurality of appliances having the same or similar cavity geometries are used when each appliance is intended to elicit tooth movement to the same tooth arrangement. However, it shall be understood that the actual amount of movement achieved by each appliance may vary, e.g., depending on the extent to which the tooth has been prepared for repositioning at the time when the appliance is worn. For instance, if three primer appliances having the same cavity geometry are sequentially applied to reposition a tooth to a targeted location, the first appliance may elicit the least amount of tooth movement (e.g., 10% of the distance to the location), the second appliance may elicit an intermediate amount of tooth movement (e.g., 30% of the distance to the location), and the third appliance may elicit the greatest amount of tooth movement (e.g., 60% of the distance to the location).

Although changes to the position of the tooth along one dimension over time is shown, the tooth can be moved along up to 6 degrees of freedom, up to three translational and up to three rotational degrees of freedom. The incremental positions of the tooth receiving cavity and the position of the tooth along each degree of freedom can be similarly provided as the tooth is moved along a treatment vector, for example.

The primer appliances may be provided during the initial weeks of the initial portion of the movement profile 410 of the treatment, in order to apply compression to the periodontal ligaments to prepare the teeth for movement along a treatment path. The compressive force can be applied to each tooth. Alternatively or in combination, the compressive force can be applied to some of the teeth of a quadrant and not to others in a manner that prepares the teeth without the compressive force for movement. The biological response to the compressive force can occur with one or more teeth away from teeth receiving the compressive force. Although the compressive force may be applied to each tooth in a quadrant, this may not be necessary to prepare all of the teeth in a quadrant for movement as the biological response may not be localized to the teeth receiving the compressive force.

The compression may be applied in many ways to initiate a biological response. The relatively small amount of tooth movement provided with the primer stage may not comprise a portion of the planned tooth movement path. Alternatively, the small amount of tooth movement provided by the primer stage may comprise a portion of the planned tooth movement path. Although the primer stage may or may not result in significant tooth movement. As shown by tooth movement profile segment 412, in the initial weeks 410 of the treatment, there may be little or no tooth movement, corresponding to the amount of time needed for the initiation of a biological response. Alternatively, as shown by tooth movement profile segment 414, there may be a relatively small amount of tooth movement and resultant change in the position of the tooth in the direction of the desired final position, since the primer appliances may be configured to provide compression in a direction favorable for achieving the desired final position of a tooth. Other patterns of tooth movement and change in tooth position may also be possible during the initial weeks of the primer portion 410. For example, as shown by tooth movement profile segment 416, there may be a small amount of tooth movement without a clearly defined direction, such that the average change in tooth position over the initial weeks of the primer portion 410 is close to zero or even zero.

Primer appliances can be made such that teeth that do not need to be moved for treatment do not have their positions changed in the design of the primer appliance. This lack of movement at the primer stage can enhance the anchorage of the teeth that are not intended to move.

Following the primer stage, which may comprise the first 3 to 8 weeks of the treatment course, the treatment stage may begin, during which the treatment appliances can be provided to cause tooth movement in the planned path. In the middle weeks 420 of the treatment, during which the treatment appliances are provided, the rate of tooth movement and the change of the position of the tooth can be relatively greater than in the initial weeks 410. In the later weeks 430 of the treatment, which may comprise a separate refinement stage, the rate of tooth movement and the change of the position of the tooth can be relatively small and reduced from the middle weeks 420. Alternatively or in combination, the later weeks 430 may comprise a latter portion of the normal treatment course, and may move the teeth at a slower rate than during the middle weeks 420.

The properties of the primer appliances described herein may be varied as desired. In some embodiments, a primer appliance has the same or substantially similar properties as a treatment appliance. For instance, a primer appliance may be fabricated from the same or similar materials as would be used for fabricating a treatment appliance. The stiffness, thickness, hardness, stress relaxation, etc. of a primer appliance may be the same or similar as that of a treatment appliance. In alternative embodiments, a primer appliance may have different properties than a treatment appliance, e.g., with respect to stiffness, thickness, hardness, stress relaxation etc., and/or may be fabricated from different materials than those used for treatment appliances. The properties of a primer appliance may vary based on the particular types of teeth to be primed (e.g., incisors, canines, premolars, molars) and/or the types of tooth movements to be primed (e.g., translation, rotation, tipping, torque, intrusion, extrusion, etc.). Certain types of tooth movements may require a longer priming period, while other types of tooth movements may be achieved effectively with a shorter priming period.

The amount of force and/or torque applied by a primer appliance may differ from the amount of force and/or torque applied by a treatment appliance, e.g., may be more or less. In some embodiments, the teeth receiving cavities of a primer appliance are shaped to apply to apply higher amounts of force to the teeth compared to a treatment appliance, e.g., in order ensure sufficient induction of the biological response. In alternative embodiments, the teeth receiving cavities of a primer appliance are shaped to apply to apply lower amounts of force to the teeth compared to a treatment appliance, e.g., to reduce patient discomfort during the priming stage. Such variations may be patient-specific, e.g., less force applied to patients with lower pain tolerance, geriatric patients, etc. In some embodiments, a primer appliance may be shaped to apply force to teeth without eliciting movement of the teeth (e.g., using teeth receiving cavities having the same position and orientation as the corresponding received teeth), while a treatment appliance may be shaped to apply force to teeth that elicits movement of the teeth (e.g., using teeth receiving cavities having different positions and/or orientations as the corresponding received teeth). Teeth receiving cavities having the same position and orientation as the corresponding received teeth can be used to apply force to the teeth, e.g., due to distortion resulting from the movement of other teeth or forces from the tongue or cheeks with movement being constrained by the appliance.

Additionally, although in certain embodiments herein priming is used at the beginning of an orthodontic treatment, it shall be appreciated that priming may also be utilized after treatment has already started, e.g., to prime teeth that have not yet been moved in a previous treatment stage. For example, if one or more teeth are not scheduled to be moved until partway through the treatment plan, it may be beneficial to apply priming to those teeth prior to repositioning, for the reasons discussed herein. In some embodiments, some tooth receiving cavities of a single appliance may be used to prime certain teeth for movement, while other tooth receiving cavities of the same appliance may be used to apply forces to reposition other teeth. Thus, the planned movement rate for each tooth at a particular stage of treatment may vary based on whether or not the tooth has been previously repositioned during treatment and/or whether a sufficiently long period of time has elapsed since the tooth was last repositioned. In some embodiments, planning of an orthodontic treatment may involve determining a plurality of teeth to be repositioned from a first arrangement to a second arrangement during the orthodontic treatment, and identifying a first subset of teeth that have already been repositioned during a previous stage of treatment and a second subset of teeth that have not yet been repositioned during a previous stage of treatment. The first subset of teeth may not need priming to achieve effective movements, while priming of the second subset of teeth may be beneficial to prepare those teeth for movement, as described herein. Thus, the treatment planning procedure can involve determining a first movement rate for the first subset of the plurality of teeth appropriate for repositioning and a second movement rate for the second subset of the plurality of teeth appropriate for priming. For instance, the first movement rate can be greater than the second movement rate. Orthodontic appliance geometries can be determined to reposition the first and second subsets of teeth according to their respective movement rates, thus achieving selective priming of certain teeth while repositioning other teeth.

The appliances described herein can be designed and fabricated with aid of a system including one or more processors. In many embodiments, a processor comprises a user input and display for a user to position and orient a plurality of teeth at target positions and orientations for each stage of a treatment. The processor may comprise instructions to position teeth receiving cavities of the appliance at positions as described herein in order to provide one or more primer appliances, a plurality of repositioning appliances to reposition teeth with tooth movements as described herein and one or more finishing appliances as described herein. The processor may comprise instructions to manufacture a plurality of appliances with indirect manufacturing comprising thermoforming or direct manufacturing comprising one or more of 3D printing, stereolithography, or fused deposition modeling, for example.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A system for repositioning teeth of a subject, the system comprising:
   a primer appliance configured to be worn on at least a portion of a patient's teeth, the primer appliance configured to prepare the patient's teeth for subsequent repositioning as part of an orthodontic treatment plan, wherein the primer appliance comprises:
   (a) a first plurality of tooth receiving cavities shaped to receive a first plurality of the patient's teeth, wherein the first plurality of tooth receiving cavities are configured to induce a biological response of support structures supporting the first plurality of patient's teeth without repositioning the patient's teeth, and
   (b) a second plurality of teeth receiving cavities shaped to receive and enhance an anchorage of a second selected plurality of the patient's teeth; and
   one or more intermediate appliances to be placed on the at least a portion of the patient's teeth,
   wherein the one or more intermediate appliances are configured to reposition at least the first plurality of the patient's teeth along a respective plurality of tooth movement paths, and
   wherein the second plurality of the patient's teeth serve as anchors and are not repositioned during the orthodontic treatment plan.

2. The system of claim 1, further comprising one or more finishing appliances for use in a finishing stage of the orthodontic treatment plan.

3. The system of claim 1, wherein the biological response lowers resistance of a tissue of the patient to facilitate repositioning of the first plurality of the patient's teeth.

4. The system of claim 3, wherein lowering resistance of the tissue comprises one or more of: initiating bone remodeling, initiating a change in one or more properties of a periodontal ligament, initiating a change in concentration of a biochemical signal, or initiating a change in a cellular makeup of a local environment of the subject's teeth.

5. The system of claim 1, wherein the support structures comprise a periodontal ligament of the first plurality of the patient's teeth.

6. The system of claim 1, wherein the first plurality of tooth receiving cavities of the primer appliance are shaped to apply a compressive force thereby inducing the biological response without repositioning the first plurality of teeth.

7. The system of claim 1, wherein the first plurality of tooth receiving cavities of the primer appliance are shaped to apply a torque thereby inducing the biological response without repositioning the first plurality of teeth.

8. The system of claim 1, wherein the primer appliance is shaped to reduce distortion of the one or more intermediate appliances when placed on the subject's teeth.

9. The system of claim 1, wherein the primer appliance is shaped such that the first plurality of the patient's teeth are not moved when the primer appliance is worn.

10. The system of claim 1, wherein the primer appliance is designed to be worn for about three week to about twelve weeks.

11. The system of claim 1, wherein each of the one or more intermediate appliances are designed to be worn for about 7 to 14 days.

12. The system of claim 1, wherein the one or more intermediate appliances comprises a plurality of intermediate appliances to successively move the first plurality of teeth towards a target position as part of the orthodontic treatment plan.

13. The system of claim 1, wherein at least two of the one or more intermediate appliances comprises some of the same cavity geometries.

14. The system of claim 1, wherein the primer appliance and at least one of the one or more intermediate appliances comprises some of the same cavity geometries.

15. The system of claim 1, wherein at least one of the one or more intermediate appliances is designed to provide for an overcorrection of the first plurality of teeth along the respective plurality of tooth movement paths.

16. The system of claim 1, wherein each of the primer appliance and the one or more intermediate appliances comprises a polymeric shell.

17. The system of claim 1, wherein the primer appliance and the one or more intermediate appliances are fabricated prior to any of the appliances being worn by the subject as part of the orthodontic treatment plan.

18. The system of claim 1, wherein the primer appliance is indirectly fabricated through a thermoforming process.

19. The system of claim 1, wherein the primer appliance is directly fabricated through a 3D printing process.

20. The system of claim 1, wherein the first plurality of teeth are not repositioned laterally or rotationally when the primer appliance is worn by the patient.

21. The system of claim 1, wherein the support structures comprise ligaments of the periodontia, gingiva, bones of the jaw, or other supporting periodontal structures, or any combination thereof.

* * * * *